D. H. TAYLOR.
HOSE COUPLING.
APPLICATION FILED OCT. 21, 1911.
1,051,174.
Patented Jan. 21, 1913.
2 SHEETS—SHEET 1.
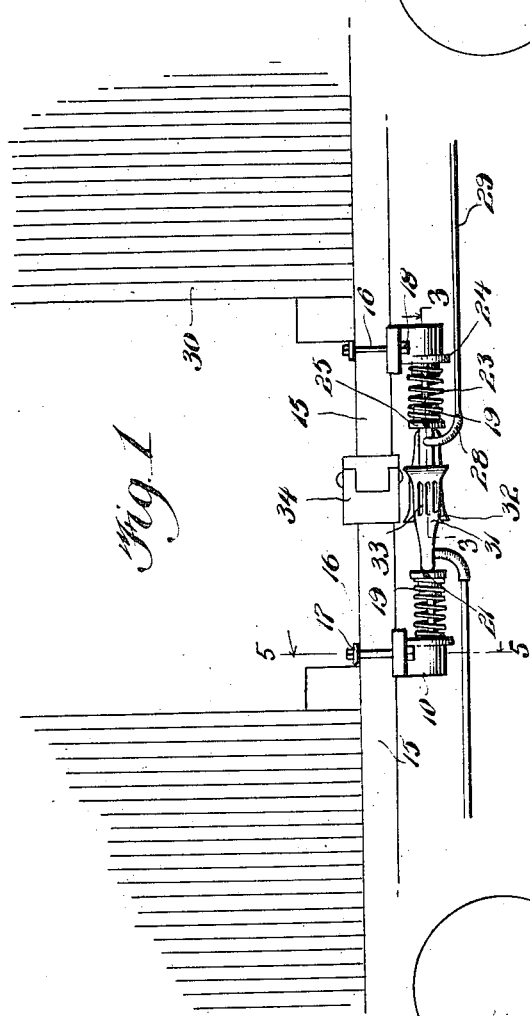
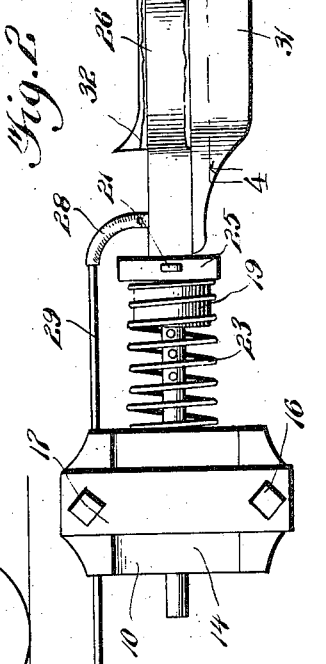
Witnesses
W. S. McDowell
F. A. Hoster
Inventor
Daniel H. Taylor
By Victor J. Evans
Attorney

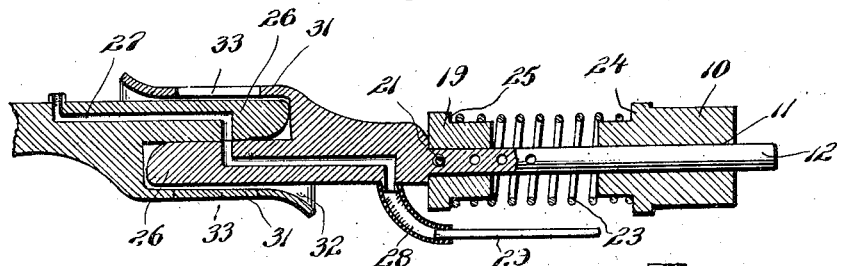
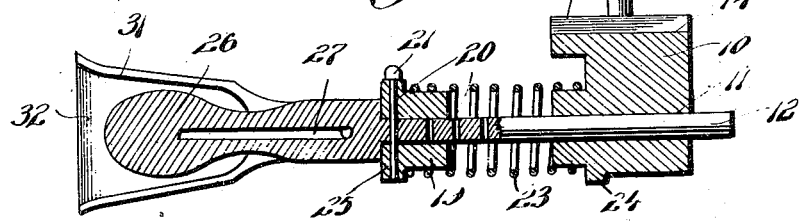
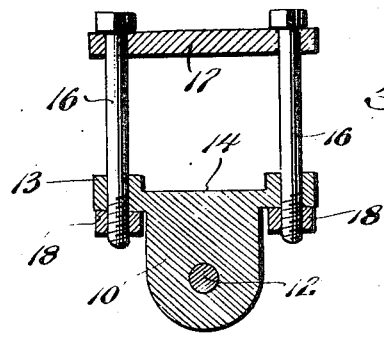

UNITED STATES PATENT OFFICE.

DANIEL H. TAYLOR, OF TERCIO, COLORADO.

HOSE-COUPLING.

1,051,174.

Specification of Letters Patent.    Patented Jan. 21, 1913.

Application filed October 21, 1911.  Serial No. 655,991.

*To all whom it may concern:*

Be it known that I, DANIEL H. TAYLOR, a citizen of the United States, residing at Tercio, in the county of Las Animas and State of Colorado, have invented new and useful Improvements in Hose-Couplings, of which the following is a specification.

An object of the invention is to provide a hose coupling for connecting the air lines on cars and the like.

For the purpose mentioned, use is made of a clamping body for connection to the draw bar of a car, a shank adjustably mounted on the clamping body and having a spoon secured thereto, the said spoon being adapted to engage a similar spoon on an adjacent car, the said similar spoon being received in a casing secured to the shank adjacent the first mentioned spoon and the said spoons being provided with passages having connection with the air lines of the adjacent cars so that the air in the air line of one car can easily flow into the air line of the adjacent car, the said shank being mounted relatively to the clamp body to absorb the usual shock occasioned when two cars are coupled together.

Reference is to be had to the accompanying drawings constituting a part of this specification, in which similar characters of reference denote corresponding parts in all the views, and in which—

Figure 1 is a fragmentary side elevation showing the ends of adjacent cars coupled together, the air lines thereof being connected by means of my device. Fig. 2 is an enlarged plan view showing my coupling connected to a similar coupling secured to an adjacent car. Fig. 3 is a horizontal sectional view on the line 3—3 in Fig. 1, looking in the direction of the arrow. Fig. 4 is a vertical longitudinal sectional view taken on the line 4—4 in Fig. 2, looking in the direction of the arrow. Fig. 5 is a vertical sectional view taken on the line 5—5 in Fig. 1, looking in the direction of the arrow.

Referring more particularly to the views, I provide a clamp body 10 provided with a longitudinally extending opening 11 in which is slidably mounted a shank 12. The upper end of the clamp body 10 is provided with flanges 13 having a recessed portion 14 therebetween to receive a draw bar 15, the said draw bar being retained in connection with the clamp body 10 by screw bolts 16 passed through a plate 17, positioned on the upper side of the draw bar, the said screw bolts passing through apertures in the flanges 13 and having nuts 18 connected therewith as shown in Fig. 1.

A collar 19 is slidably mounted on the shank 12 and is provided with an opening 20 through which is extended a pin 21, the said shank 12 being provided with spaced apertures 22 and through which the pin 21 is adapted to pass to adjustably retain the collar 19 in rigid position on the shank 12. A helical spring 23 is mounted to encircle the shank 12 and has one end thereof abutting against a circular flange 24 formed on the clamp body 10 with the other end of the said spring abutting against a circular flange 25 formed on the collar 19, one end of the spring being secured to the clamp body 10 and the other end being secured to the collar 19. By removing the pin 21 from the collar 19 and the shank 12 the collar can be slidably operated on the shank 12 and against the tension of the spring 23 after which the pin 21 is repositioned to extend through the collar 19 and shank 12, thus permitting an adjustment of the collar 19 relatively to the shank 12. The outer end of the shank 12 terminates in a spoon 26 provided with an air passage 27 and a hose 28 is adapted for connection with the spoon 26 to connect the air passage 27 with the air line 29 of a car 30. Formed on the inner end of the spoon 26 and offset to extend outwardly in parallel relation to the spoon and adjacent thereto is a casing 31 provided with a recessed portion 32 and having a series of apertures 33 therein, the said casing being adapted to receive a spoon similar to the spoon 26, secured to an adjacent car, so that the air passage in the spoon 26 will connect with the air passage in the spoon in the adjacent car, thus permitting the air in the air line of the car 30 to pass into the air line of the adjacent car.

The draw bar 15 is provided with the usual coupling 34 adapted for coupling one car to another and my coupling device is so arranged relatively to the coupling 34 that when two cars are coupled together, the air hose coupling of the adjacent car will engage with the air hose coupling on the car 30 so that the air in the air line 29 will be permitted to pass into the air line of the adjacent car, the spoon on the adjacent car being received in the casing 31 and the said spoon on the adjacent car being constructed similar to the spoon 26. Thus it will be readily seen that when the two cars are connected by means of the usual coupling members, the spoon of one car will be received in the casing on the adjacent car and as the shank 12 is slidably mounted relatively to the clamp body 10 the concussion produced when the two cars are coupled together, will be substantially absorbed by the spring 23 mounted between the clamp body 10 and the collar 19 adjustably retained in rigid position on the shank 12. By referring to Fig. 3, it will be seen that the air passage 27 in the spoon 26, at the inner end of the spoon, extends at right angles to the longitudinal axis of the spoon and terminates at the rear end of the spoon to receive the air hose 28 and the air passage at the outer end of the spoon 26 also extends transversely to the spoon to aline with the air passage in the spoon of the adjacent car. The apertures in the casing 31 permit an easy escape for the air in the air line 29 when it is desired to exhaust the air from the air line and when the car on which the casing is mounted is not connected to an adjacent car.

Having thus fully described the invention, what I claim as new, is:—

In a device of the class described, a clamp body for connection with the draw bar of a car, a shank slidably mounted on the clamp body and provided with a series of spaced apertures, a collar slidably mounted on the said shank and provided with an aperture adapted to aline with the apertures in the said shank, a pin for removable engagement with the said collar and adapted to extend in an aperture in the collar and one of the apertures in the said shank to rigidly retain the collar on the shank, a spring mounted to encircle the said shank and connected to the said clamp body and the said collar, a spoon projecting from the outer end of the said shank and provided with an air passage adapted for connection with the air line of the car and an apertured casing provided with a recess and adapted to receive the spoon on an adjacent car so that the air passage in the spoon on the adjacent car will register with the air passage in the spoon on the first mentioned car.

In testimony whereof I affix my signature in presence of two witnesses.

DANIEL H. TAYLOR.

Witnesses:
ALLEN B. DOVETON,
FRANK W. WHITENOCK.